United States Patent
Shen et al.

(10) Patent No.: US 12,388,488 B1
(45) Date of Patent: Aug. 12, 2025

(54) SPREAD SPECTRUM MODULATION OVER AN ASYMMETRIC ETHERNET LINK

(71) Applicant: Marvell Asia Pte Ltd, Singapore (SG)

(72) Inventors: David Shen, Saratoga, CA (US); Seid Alireza Razavi Majomard, Belmont, CA (US); William Chu, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 510 days.

(21) Appl. No.: 17/954,387

(22) Filed: Sep. 28, 2022

Related U.S. Application Data (60) Provisional application No. 63/250,195, filed on Sep. 29, 2021.

(51) Int. Cl.
  *H04B 1/707* (2011.01)
  *H04J 13/00* (2011.01)
  *H04L 5/14* (2006.01)

(52) U.S. Cl.
  CPC .......... *H04B 1/707* (2013.01); *H04J 13/0044* (2013.01); *H04L 5/14* (2013.01)

(58) Field of Classification Search
  CPC ......... H04B 1/707; H04J 13/0044; H04L 5/14
  See application file for complete search history.

(56) References Cited

U.S. PATENT DOCUMENTS

| | | | |
|---|---|---|---|
| 11,153,063 | B2 | 10/2021 | Wu et al. |
| 11,296,904 | B1 | 4/2022 | Benyamin et al. |
| 11,632,295 | B1 * | 4/2023 | Langner ................ H04L 67/104 370/254 |
| 2008/0267260 | A1 * | 10/2008 | Bertrand ................ H04B 1/707 375/147 |
| 2021/0281289 | A1 * | 9/2021 | Fung ..................... H04L 27/156 |

OTHER PUBLICATIONS

IEEE Std. 802.3ch-2020, "IEEE Standard for Ethernet, Amendment 8: Physical Layer Specifications and Management Parameters for 2.5 Gb/s, 5 Gb/s, and 10 Gb/s Automotive Electrical Ethernet", pp. 1-207, year 2020.

(Continued)

*Primary Examiner* — Tejis Daya
(74) *Attorney, Agent, or Firm* — Meitar Patents Ltd.; Daniel Kligler

(57) ABSTRACT

An automotive Ethernet physical-layer (PHY) transceiver includes an Analog Front End (AFE) and a digital processor. The AFE is coupled via a full-duplex Ethernet link to a peer transceiver. The AFE is configured to receive from the peer transceiver, over the full-duplex Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor including a ratio between a spreading chip-rate and the reception data rate, and to convert the received analog Ethernet signal into a digital signal. The digital processor is configured to de-spread the digital signal using the spreading sequence to recover the data symbols.

26 Claims, 4 Drawing Sheets

(56) References Cited

OTHER PUBLICATIONS

IEEE Std. 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, year 2016.

IEEE Std. 802.3bp-2016, "IEEE Standard for Ethernet, Amendment 4: Physical Layer Specifications and Management Parameters for 1 Gb/s Operation over a Single Twisted-Pair Copper Cable", pp. 1-211, year 2016.

IEEE Std. 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, year 2020.

Sedarat, "Optimized Asymmetric Operation—Technical Feasability," Ethernovia, pp. 1-22, Jan. 16, 2020.

* cited by examiner

SPREAD SPECTRUM MODULATION OVER AN ASYMMETRIC ETHERNET LINK

CROSS-REFERENCE TO RELATED APPLICATIONS

This application claims the benefit of U.S. Provisional Patent Application 63/250,195, filed Sep. 29, 2021, whose disclosure is incorporated herein by reference.

FIELD OF THE DISCLOSURE

The present disclosure relates generally to network communication, and particularly to methods and systems for applying spread spectrum modulation in communication over asymmetric Ethernet links.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE Standard for Ethernet—Amendment 5: Physical Layer Specifications and Management Parameters for 10 Mb/s Operation and Associated Power Delivery over a Single Balanced Pair of Conductors," IEEE 802.3cg-2019, February, 2020; in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015, March, 2016; in "IEEE Standard for Ethernet Amendment 4: Physical Layer Specifications and Management Parameters for 1 Gb/s Operation over a Single Twisted-Pair Copper Cable," IEEE 802.3bp-2016, September, 2016; and in "IEEE Standard for Ethernet—Amendment 8:Physical Layer Specifications and Management Parameters for 2.5 Gb/s, 5 Gb/s, and 10 Gb/s Automotive Electrical Ethernet," IEEE 802.3ch-2020, June, 2020.

The description above is presented as a general overview of related art in this field and should not be construed as an admission that any of the information it contains constitutes prior art against the present patent application.

SUMMARY

An embodiment that is described herein provide an automotive Ethernet physical-layer (PHY) transceiver that includes an Analog Front End (AFE) and a digital processor. The AFE is coupled via a full-duplex Ethernet link to a peer transceiver, the AFE configured to: receive from the peer transceiver, over the full-duplex Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor including a ratio between a spreading chip-rate and the reception data rate, and to convert the received analog Ethernet signal into a digital signal. The digital processor is configured to de-spread the digital signal using the spreading sequence to recover the data symbols.

In some embodiments, during a link-training phase, the digital processor is configured to monitor reception conditions affecting the Ethernet signal, and to negotiate with the peer transceiver the Spreading Factor selected from among multiple candidate Spreading Factor values, based at least on the monitored reception conditions. In other embodiments, the digital processor is configured to determine the candidate Spreading Factor values based on the monitored reception conditions and on one or more of a maximal bandwidth requirement and a power consumption requirement. In yet other embodiments, the digital processor is configured to evaluate a criterion for triggering modification of the Spreading Factor, and in response to detecting that the criterion is met, determine a modified Spreading Factor, and inform the peer transceiver of the modified Spreading Factor.

In an embodiment, the digital processor is configured to measure a reception quality or a predicted reception quality of the Ethernet signal, and to determine that the criterion for triggering Spreading Factor modification is met when the reception quality or the predicted reception quality varies by an amount larger than a specified reception quality amount. In another embodiment, the digital processor is configured to, in response to detecting that the reception quality or the predicted reception quality has increased by more than the specified amount, select the modified Spreading Factor value smaller than the Spreading Factor. In yet another embodiment, the digital processor is configured to, in response to detecting that the reception quality or the predicted reception quality has degraded by more than the specified amount, select a modified Spreading Factor value larger than the Spreading Factor.

In some embodiments, the digital processor is configured to determine the modified Spreading Factor by modifying the chip-rate associated with the Spreading Factor, and further associate the modified Spreading Factor with a modified spreading sequence in accordance with the modified chip-rate. In other embodiments, the digital processor is configured to determine the modified Spreading Factor by modifying the reception data rate of the data symbols. In yet other embodiments, the digital processor is configured to specify a maximal chip-rate supported, and to determine the modified Spreading Factor by modifying the reception data rate, when the chip-rate associated with the Spreading Factor has reached the maximal chip-rate supported.

In an embodiment, the digital processor is configured to coordinate with the peer transceiver a time for starting application of the modified Spreading Factor in sending subsequent data symbols from the peer transceiver to the automotive Ethernet PHY transceiver.

There is additionally provided, in accordance with an embodiment that is described herein, a method for data communication, including, in an automotive Ethernet physical-layer (PHY) transceiver coupled via a full-duplex Ethernet link to a peer transceiver, receiving from the peer transceiver, over the full-duplex Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor including a ratio between a spreading chip-rate and the reception data rate, and converting the received analog Ethernet signal into a digital signal. The digital signal is de-spread using the spreading sequence to recover the data symbols.

There is additionally provided, in accordance with an embodiment that is described herein an automotive Ethernet physical-layer (PHY) transceiver that includes a digital processor and an Analog Front End (AFE). The digital processor is configured to receive a sequence of data symbols for transmission to a peer transceiver at a transmission data rate larger than a reception data rate used in receiving data from the peer transceiver, to generate a digital Ethernet signal by modulating the data symbols, the modulation includes using a spreading sequence having a Spreading Factor including a ratio between a spreading chip-rate and the transmission data rate, and to convert the digital Ethernet signal to an analog Ethernet signal. The AFE is coupled via a full-duplex Ethernet link to the peer transceiver. The AFE is configured to transmit the analog Ethernet signal to the peer transceiver over the full-duplex Ethernet link.

In some embodiments, during a link-training phase, the digital processor is configured to receive from the peer transceiver multiple candidate Spreading Factor values, to select the Spreading Factor from among the multiple candidate Spreading Factor values, and to inform the peer transceiver of the selected Spreading Factor.

There is additionally provided, in accordance with an embodiment that is described herein, a method for data communication, including, in an automotive Ethernet physical-layer (PHY) transceiver that is coupled via a full-duplex Ethernet link to the peer transceiver, receiving a sequence of data symbols for transmission to the peer transceiver at a transmission data rate larger than a reception data rate used in receiving data from the peer transceiver. A digital Ethernet signal is generated by modulating the data symbols, the modulation includes using a spreading sequence having a Spreading Factor including a ratio between a spreading chip-rate and the transmission data rate. The digital Ethernet signal is converted to an analog Ethernet signal, and the analog Ethernet signal is transmitted to the peer transceiver over the full-duplex Ethernet link.

The present disclosure will be more fully understood from the following detailed description of the embodiments thereof, taken together with the drawings in which:

DETAILED DESCRIPTION OF EMBODIMENTS

Embodiments that are described herein provide improved Ethernet physical layer (PHY) transceivers and associated methods, for communication over full-duplex two-way channels, e.g., twisted-pair copper wire links. The embodiments described herein refer mainly to asymmetric links, in which the transmission bit rates differ between the two directions of the two-way link, and wherein spread spectrum modulation is applied to data transmitted at the lower bit rate.

The asymmetric PHY transceivers described herein are useful, for example, in automotive applications, e.g., systems that collect data from sensors within a vehicle and also control and configure the sensors. Using an asymmetric link is advantageous because sensor data (in one direction) is much more voluminous than control data (in the opposite direction). The disclosed techniques are generally applicable, however, in various other applications that involve asymmetric links, for example in industrial and/or smart-home networks, as well as in video distribution systems. Certain aspects of bidirectional asymmetric Ethernet communication in such environments are addressed in U.S. patent application Ser. No. 16/419,643, entitled "Asymmetric Energy Efficient Ethernet"; and in U.S. patent application Ser. No. 16/815,299, entitled "Managing Bidirectional Communication in Constrained Environments" which are assigned to the assignee of the present patent application and whose disclosures are incorporated herein by reference.

In some applications, e.g., in an automotive environment, the High-Speed (HS) communication direction carries HS data provided by the sensors, whereas the Low-Speed communication direction carries control data for controlling the operation of the sensors. For example, assuming a camera sensor, the control data may carry control commands such as power on/off, setting the angle of the camera relative to the vehicle chassis, selecting between daylight and darkness modes of operation, various operational settings of the camera sensor, and the like. The HS data from the camera sensor may be used for controlling various functions in the vehicle and feeding monitors and screens.

The communication over the Ethernet link is subjected to Electromagnetic Interference (EMI) from various sources, which may corrupt electrical signals, such as signals carrying data over Ethernet links, leading to communication errors and system malfunction.

In an automotive environment, sources of EMI may reside within a vehicle or externally to the vehicle. External EMI sources include, for example, radio towers, electric power transition lines and airport radar, and many others. EMI sources that are internal to the vehicle include, for example, the vehicle engine and other mechanical and electromechanical components, the windshield wipers, mobile phones, an infotainment system, and the like. Moreover, in a full-duplex bidirectional link, mutual interference may occur between the two communication directions.

In some applications of asymmetric Ethernet links, communication errors in the HS direction are more tolerable than those in the LS (low speed) direction. For example, in a vehicle, loss of a small portion of sensor data (in the HS direction), e.g., occasional loss of a video frame, is typically manageable. A Failure to reliably deliver control and configuration commands to the sensors (in the LS direction), however, may be result in unexpected behavior of the vehicle, and may raise safety issues.

In the disclosed embodiments, to improve immunity to noise and EMI, data transmitted in the LS direction is modulated using a spread spectrum modulation scheme. Specifically, at a given LS bit rate, each bit is multiplied by a spreading sequence comprising sub-bits that are referred to as "chips." Consequently, the spreading sequence has a chip-rate that is much higher than the given bit rate. Due to multiplying the bits by the spreading sequence, the bandwidth occupied by the transmitted signal increases by a factor denoted "Spreading Factor" (SF). The SF value equals the ratio between the chip-rate and the bit rate. At the receiving end, the signal is de-spread by the same spreading sequence to recover the unmodulated bits.

Using the spread spectrum modulation results in a low-complexity design and reduced power consumption. Moreover, due to the coding gain achieved by the spread spectrum modulation, echo cancelation, which typically consumes high amounts of power, may be modified into a low-complexity low-power echo canceler or even completely eliminated.

In an embodiment, the spreading sequence is designed to have good autocorrelation properties, resulting in a significant processing gain (on the order of the SF value) that emphasizes the desired signal over interfering signals such as channel noise and EMI interference. The usage of spread spectrum modulation thus improves immunity to noise and EMI interference.

A high SF value typically is advantageous because it achieves a high processing gain and therefore also high reception quality. Increasing the SF value, however, results in increased bandwidth occupied by the transmitted signal and therefore is limited by the effective bandwidth of the wire link. Moreover, a high SF value typically incurs high power consumption because of the high chip-rate used. It is noted that in some embodiments, the receiver is required to identify the starting point of the spreading sequence, which is typically harder with long spreading sequences.

In some embodiments, for efficient usage of spread spectrum modulation, the SF value is adapted to the channel quality. As such, the SF value may be increased to compensate for a degradation in the channel quality or decreased when channel quality improves. In an example embodiment, channel quality is monitored, and in response to identifying that the channel quality falling below a channel quality threshold, or the channel quality being forecast to fall below that channel, a spreading sequence having a selected SF is applied to the signal. In some embodiments the value of the applied SF is a function of actual or forecast degradation in the channel quality. The forecast degradation or predicted channel conditions may be evaluated using any suitable method, such as, for example, Artificial Intelligence (AI) methods.

In some embodiments, the bits to be transmitted are associated with data symbols, so that each data symbol corresponds to a group of multiple bits. In the description that follows, the term "data rate" refers to the rate of the data symbols at which data symbols are transmitted or received. It is noted that in case of single-bit data symbols, the data rate equals the bit rate. Considering data symbols of one or more bits per symbol, the SF value is defined as the ratio between the chip-rate and the data rate. The SF may be alternatively defined as the length of the spreading sequence, meaning the number of chips in the spreading sequence per bit, or per a data symbol in case of multi-bit data symbols. The two definitions of the SF are equivalent. In the description that follows the term "spreading sequence" is also referred to as a "spreading code."

Consider an automotive Ethernet physical-layer (PHY) transceiver, comprising an Analog Front End (AFE) and a digital processor. The AFE is coupled via a full-duplex Ethernet link to a peer transceiver, and is configured to receive from the peer transceiver, over the Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor (SF) comprising a ratio between a spreading chip-rate and the reception data rate, and to convert the received analog Ethernet signal into a digital signal. The digital processor is configured to de-spread the digital signal using the spreading sequence to recover the data symbols.

In some embodiments, the PHYs negotiate the value of the SF during a link-training phase. To this end, the digital processor monitors reception conditions affecting the Ethernet signal, negotiates with the peer transceiver, based at least on the reception conditions, the SF selected from among multiple candidate SF values. The digital processor may determine the candidate SF values, for example, based on a maximal bandwidth requirement and/or on a power consumption requirement.

In some embodiments, the PHYs may adapt the SF to channel conditions and/or to predicted channel conditions. To this end, the digital processor evaluates a criterion for triggering modification of the SF, and in response to detecting that the criterion is met, determines a modified SF, and informs the peer transceiver of the modified SF. The digital processor measures a reception quality of the Ethernet signal and/or predicted reception quality, and triggers SF modification when the reception quality and/or the predicted reception quality varies by an amount larger than a specified reception quality amount.

The digital processor may increase or decrease the SF value as required. For example, in response to detecting that the reception quality or the predicted reception quality has increased by more than the specified amount, the digital processor selects the modified SF value smaller than the SF. On the other hand, in response to detecting that the reception quality or the predicted reception quality has degraded by more than the specified amount, the digital processor selects a modified SF value larger than the SF. Setting the SF, or its modification, may be done when the vehicle is started and/or by periodically monitoring changes to channel quality and in response adjusting the SF value. It is noted that the SF value may be set for each link independently, for all links in a particular zone of a vehicle network, or for an entire vehicle network.

The digital processor may modify the SF, e.g., by modifying the chip-rate associated with the SF, and further associate the modified SF with a modified spreading sequence in accordance with the modified chip-rate. Alternatively, the digital processor modifies the SF by modifying the reception data rate of the data symbols. In an embodiment, the digital processor specifies a maximal chip-rate supported, and modifies SF by modifying the reception data rate, when the chip-rate associated with the SF has reached the maximal chip-rate supported.

In some embodiments, to guarantee smooth transition to the modified SF, the digital processor coordinates with the peer transceiver a time for starting application of the modified SF in sending subsequent data symbols from the peer transceiver to the automotive Ethernet PHY transceiver.

In the disclosed techniques a spread spectrum modulation scheme is applied in the LS communication. By using multiplying bits or data symbols by a high-rate sequence of chips, the bandwidth of the LS Power Spectral Density (PSD) increases and its amplitude decreases. Consequently, the LS channel becomes more immune to noise and EMI interference. Moreover, by adapting the SF to varying channel conditions, the SF value can be modified on the fly, so as to achieve both high processing gain and low power consumption to increase immunity to noise and EMI when needed, or to reduce bandwidth and power consumption when high immunity to noise is not required.

Figure 1:
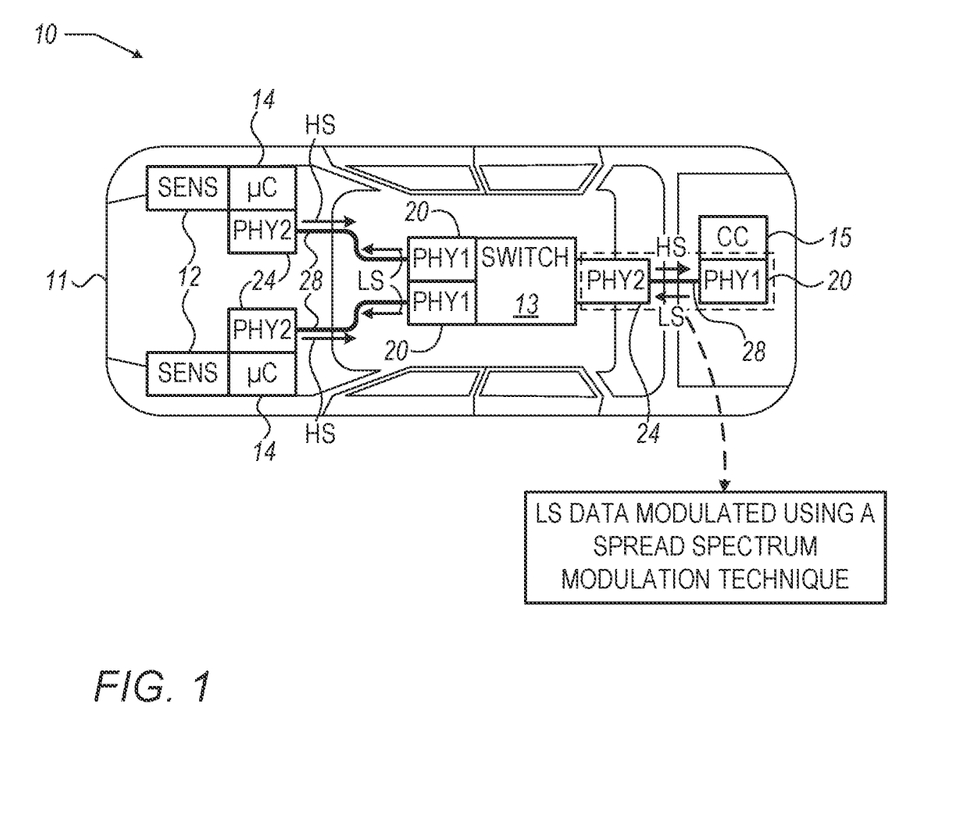
FIG. 1 is a block diagram that schematically illustrates an automotive communication system supporting spread spectrum modulation over an Ethernet link, in accordance with an embodiment that is described herein.

FIG. 1 is a block diagram that schematically illustrates an automotive communication system 10 supporting spread spectrum modulation over an Ethernet link, in accordance with an embodiment that is described herein.

System 10 is installed in a vehicle 11, and comprises multiple sensors 12, an Ethernet switch 13, multiple microcontrollers (μC) 14, a central controller (CC) 15, multiple Ethernet physical layer (PHY) transceivers 20 of a first type (denoted PHY1), and multiple Ethernet PHY transceivers 24 of a second type (denoted PHY1).

In various embodiments, sensors 12 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

In the present example, each sensor 12 is connected to a respective microcontroller 14, which is in turn connected to a respective PHY transceiver 24. The PHY transceiver 24 of each sensor 12 is connected by a link 28 to a peer PHY transceiver 20 coupled to a port of switch 13. On the sensor side of a given link, microcontroller 14 serves as a Medium Access Control (MAC) controller. On the switch side of a given link, MAC functions are carried out by switch 13.

Automotive communication system 10 is an example use-case suitable for asymmetric Ethernet communication. Typically, sensors 12 generate large amounts of data that are sent to central computer (CC) 15 for analysis. In the opposite direction, the data typically comprise low-rate control and configuration data from CC 15 to sensors 12. In such a scenario, asymmetric communication provides better utilization of Ethernet links 28.

In the embodiment of FIG. 1, PHY transceivers 20 (denoted PHY1) transmit at a bit rate referred to as "low speed" (LS) and receive at a bit rate referred to as "high speed" (HS). PHY transceivers 24 (denoted PHY2) transmit at the "high speed" (HS) bit rate and receive at the "low speed" (LS) bit rate. Pairs of PHY transceivers 20 and 24 communicate with one another over twisted-pair copper links 28, which serve as full-duplex wire channels. As seen in the figure, the pairs of PHY transceivers 20 and 24 are arranged so that transmission from sensors 12 to CC 15 is performed at the HS bit rate, and transmission from CC 15 to sensors 12 is performed at the LS bit rate, in an embodiment.

In one embodiment, the HS bit rate is 10G bits per second (10 Gbps) in accordance with IEEE 802.3ch, and the LS bit rate is 100 Mbps in accordance with IEEE 802.3bw. In another embodiment, the HS bit rate is 10 Gbps in accordance with IEEE 802.3ch, and the LS bit rate is 10 Mbps in accordance with IEEE 802.3cg(10Base-T1s). In alternative embodiments, the LS bit rate and the HS bit rate may be chosen to be any other suitable bit rates. The link between PHY transceivers 20 and 24 may comprise any other two-way medium suitable for full-duplex communication.

As will be described in detail below, in some embodiments, to mitigate noise and interference, e.g., due to Electromagnetic Interference (EMI), the bits to be transmitted (or data symbols to which groups of the bits are mapped) are modulated using a spread spectrum modulation scheme, e.g., a Direct Sequence Spread Spectrum (DSSS) modulation scheme. Moreover, the spread spectrum modulation may be adapted to channel conditions and/or to predicted channel conditions, in an embodiment.

Figure 2:
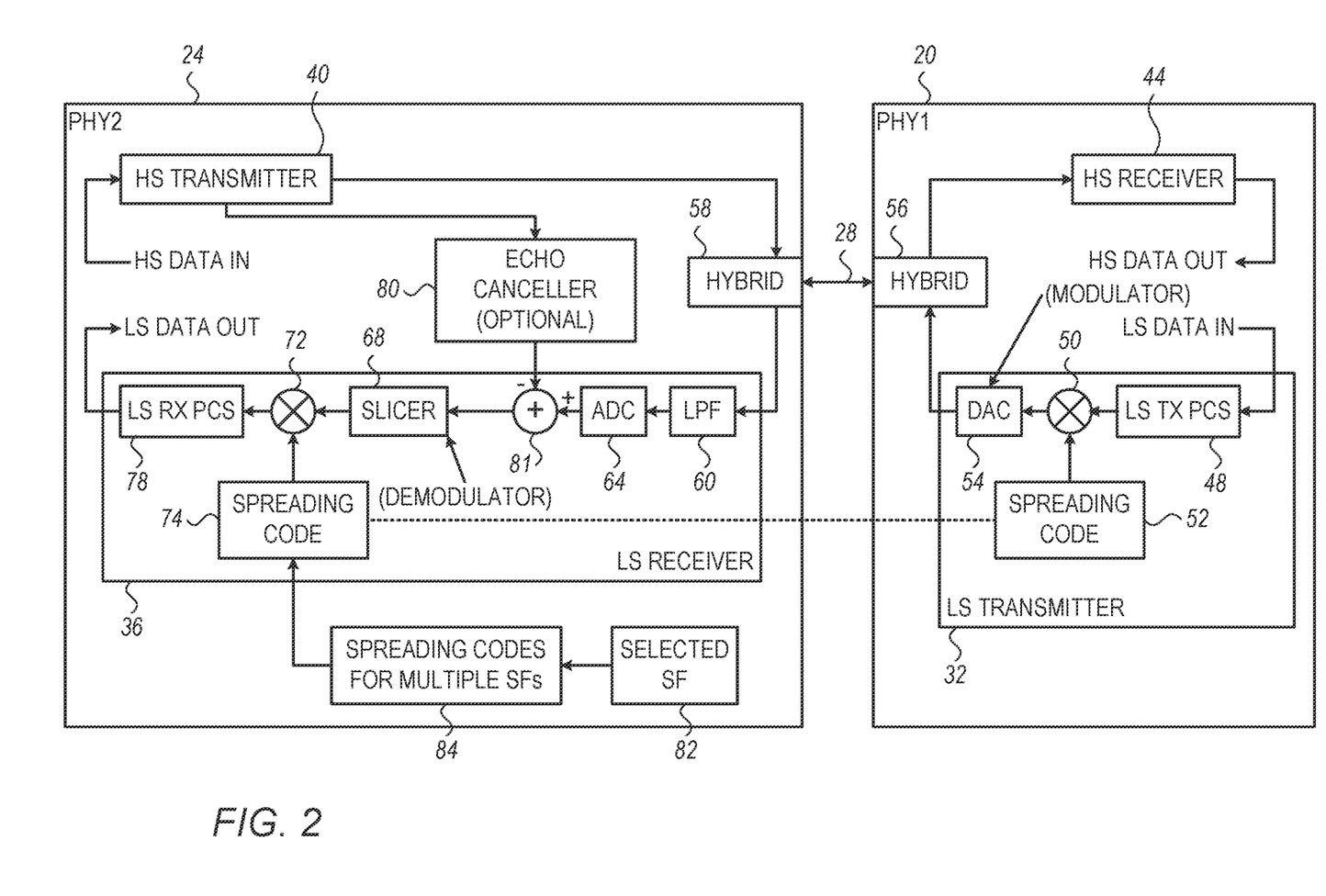
FIG. 2 is a block diagram that schematically illustrates a pair of asymmetric Ethernet physical layer (PHY) transceivers of the automotive communication system of FIG. 1, communicating over a full-duplex two-way link, in accordance with an embodiment that is described herein.

FIG. 2 is a block diagram that schematically illustrates a pair of asymmetric Ethernet physical layer (PHY) transceivers 20 and 24 of automotive communication system 10, communicating over a full-duplex two-way link 28, in accordance with an embodiment that is described herein.

The term "asymmetric" in the present context means that the transmission bit rates differ between the two directions of the two-way link. As noted above, PHY transceiver 20, denoted PHY1, transmits at the "low speed" (LS) bit rate and receives at the "high speed" (HS) bit rate, whereas PHY transceiver 24, denoted PHY2, transmits at the "high speed" (HS) bit rate and receives at the "low speed" (LS) bit rate.

In the disclosed embodiments, the LS communication (PHY1 to PHY2, right-to-left in FIG. 2) and the HS communication (PHY2 to PHY1, left-to-right in FIG. 2) are conducted simultaneously over the same twisted-pair link 28. In the frequency domain, the Power Spectral Density (PSD) of the LS signal (with no spread spectrum modulation) is concentrated between baseband and 50 MHz (for a 100 Mbps signal) or between baseband and 5 MHz (for a 10 Mbps signal). The PSD of the 10 Gbps HS signal is concentrated between baseband and 5 GHz. Thus, the spectra of the HS and LS signal overlap at the bottom of the spectrum, and may interfere with one another. As will be shown below, this mutual interference is mitigated by applying spread spectrum modulation in the LS communication from PHY1 to PHY2.

In the example embodiment of FIG. 2, PHY transceiver 20 comprises a LS transmitter (LS TX) 32 that is configured to generate and transmit the LS signal over link 28, and PHY transceiver 24 comprises a LS receiver (LS RX) 36 that is configured to receive the LS signal. PHY transceiver 24 comprises a HS transmitter (HS TX) 40 that is configured to generate and transmit the HS signal over link 28, and PHY transceiver 20 comprises a HS receiver (HS RX) 44 that is configured to receive the HS signal.

In an embodiment, LS TX 32 receives input LS data (denoted "LS DATA IN"), typically from an Ethernet Medium Access Control (MAC) device (not shown in the figure for clarity) that is coupled to PHY transceiver 20.

PHYs 20 and 24 communicate with one another using a Physical Coding Sublayer (PCS) implemented in the digital domain. Among other tasks, the PCS performs data encoding and decoding, scrambling and descrambling, and the like.

In the embodiment of FIG. 2, LS TX 32 comprises a LS Tx PCS 48 that processes the input LS data (LS DATA IN) to generate a stream of bits for transmission at the LS bit rate. In applying spread spectrum modulation, each bit is multiplied, using a multiplier 50, by a spreading code 52, to produce a stream of chips. A Digital to Analog Converter (DAC) 54 converts the multiplied bits into an analog signal, which is transmitted over link 28 via a hybrid module 56.

In some embodiments, DAC 54 comprises a modulator that applies to the bits a suitable modulation scheme, such as, for example, a Pulse Amplitude Modulation (PAM) or a Quadrature Amplitude Modulation (QAM) scheme. In such embodiments, groups of consecutive bits are multiplied by the sequence code and converted to respective data symbols. The number of bits in these groups equals the number of bits per data symbol. The associated data rate is defined as the bit rate divided by the number of bits per data symbol. For example, with a four-level PAM, groups of two bits are mapped to respective data symbols, and the data rate is half the bit rate. In some embodiments, the spreading code is applied to the final PAM-4 symbols. In this case, the SF equals the ratio between the chip-rate and transmitted symbol rate (e.g., data rate), wherein the symbol rate is half the bit rate of the transmitter.

In PHY2 24, the analog LS signal is received via a hybrid module 58 and processed by an analog Low Pass Filter (LPF) 60 to remove undesirable spectral content above the bandwidth occupied by the analog LS signal. An Analog to Digital Converter (ADC) 64 samples the filtered analog LS signal output by the LPF, and digitizes it to generate a digital LS signal. A slicer 68 serves as a demodulator for recovering the chip stream at the input to DAC 54. In some embodiments, the processing chain in the LS receiver includes an equalizer (not shown). Sequences of chips corresponding to bits or to data symbols are multiplied, using a multiplier 72, by a spreading code 74 that typically equals spreading code 52 of LS transmitter 32, to recover the bits transmitted in the LS direction from PHY1 to PHY2. A LS RX PCS 78 processes the recovered bits and outputs the recovered data, denoted "LS DATA OUT."

In some embodiments, PHY2 comprises an echo canceler 80, that is configured to eliminate or reduce echo signals originating by transmissions of HS transmitter 40 that are reflected back to the LS receiver. A subtractor 81 subtracts a cancelation signal generated by the echo canceller from the digital LS signal output by ADC 64. In some embodiments, due to using spread spectrum modulation for LS communication, a low-complexity echo canceler (80) may be sufficient, or the echo canceler (80) may even be omitted, which reduces the overall complexity and power consumption.

In the HS communication from PHY2 to PHY1, HS Tx 40 receives a stream of bits at the HS bit rate, converts them into an analog HS signal, and transmits the analog HS signal via hybrid 58 and over link 28 to PHY1. The transmitter may apply to the transmitted bits any suitable modulation scheme, such as, for example, a PAM modulation scheme. In PHY1, hybrid 56 receives the analog HS signal and provides it to HS receiver 44, which recovers the HS data, denoted "HS DATA OUT." In some embodiments, the HS receiver comprises an equalizer (not shown in the figure) for improving reception quality in the HS direction. The equalizer may comprise a Decision-Feedback Equalizer (DFE), a Feed-Forward Equalizer (FFE), or both.

In some embodiments, PHY2 holds (e.g., in a local or external memory) multiple spreading codes 84 corresponding to multiple respective SF values. In an embodiment, PHY2 and PHY1 negotiate the SF value to be used, and PHY2 selects spreading code 74 from among the multiple spreading codes, based on a SF value 82 selected in the negotiation. In one embodiment, PHY2 informs PHY1 of the spreading code (74) corresponding to the selected SF. In another embodiment, PHY1 holds multiple spreading codes, similarly to spreading codes 84 of PHY2, and selects one of these spreading coeds based on the selected SF value. Methods for negotiating the SF value will be described with reference to FIG. 3 below.

Figure 3:
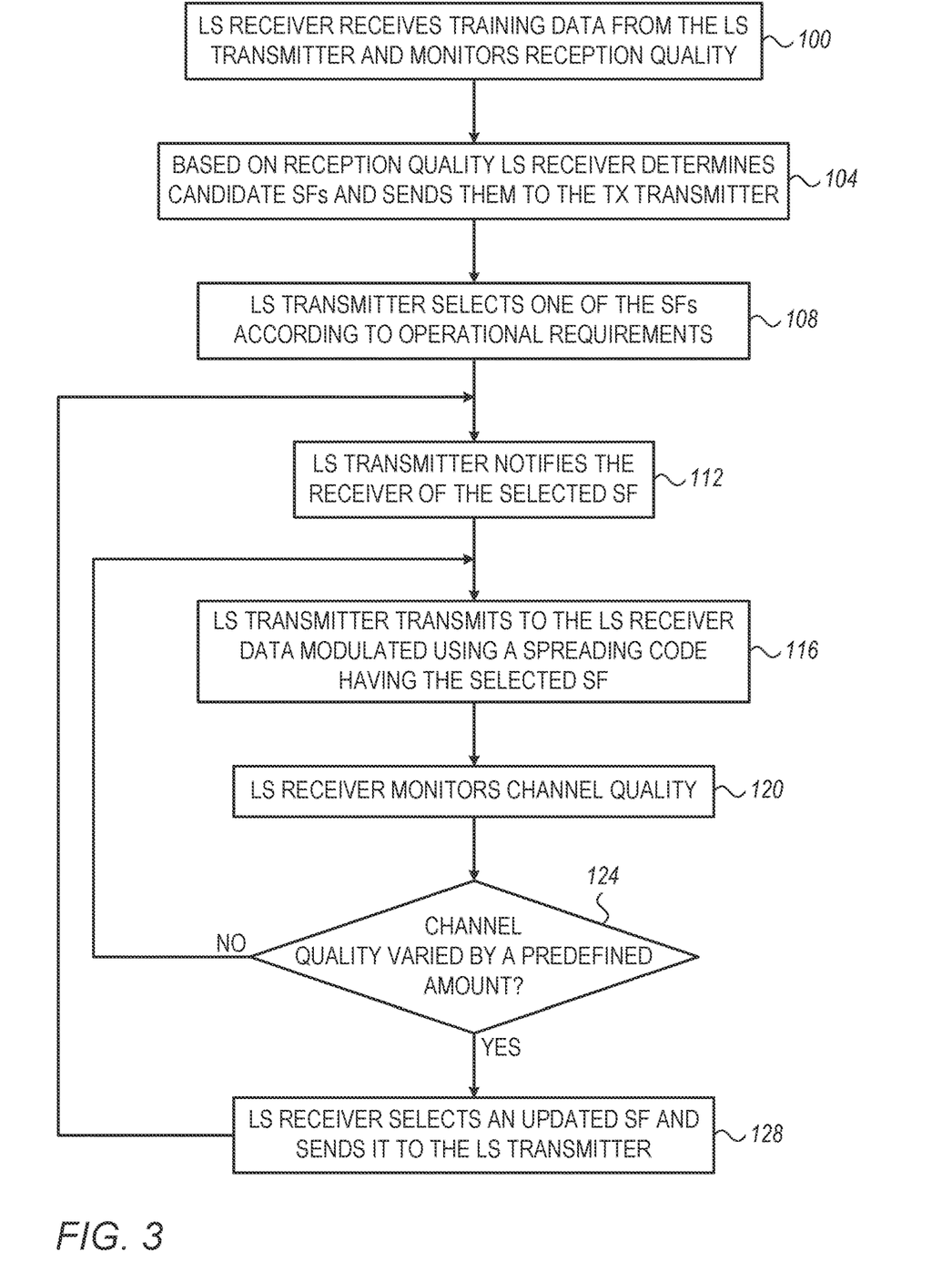
FIG. 3 is a flow chart that schematically illustrates a method for adaptive spread spectrum modulation, in accordance with an embodiment that is described herein.

FIG. 3 is a flow chart that schematically illustrates a method for adaptive spread spectrum modulation, in accordance with an embodiment that is described herein.

The method will be described as executed by LS transmitter 32 of PHY1 20 and LS receiver 36 of PHY2 24. In describing the method, it is assumed for the sake of clarity, that LS transmitter 32 and LS receiver 36 implement at least some of the control functionality that is typically carried out by PHY transceivers 20 and 24, e.g., functionality related to negotiation of the SF value.

The method begins at a training operation 100, with LS receiver 36 receiving training data from LS transmitter 32 over Ethernet link 28. During the training period, the LS receiver monitors the reception quality, e.g., monitor reception conditions affecting the Ethernet signal. As described below, the LS receiver negotiates with the LS transceiver the SF value, selected from among multiple candidate SF values, based at least on the monitored reception conditions.

At a SF reporting operation 104, the LS receiver determines candidate SFs, based on the monitored reception quality, and reports the candidate SFs to the LS transmitter. In an example embodiment, the LS receiver selects the candidate SFs from among a group of predefined SF values. In case the channel conditions are known beforehand, the LS receiver may determine a single candidate SF. The reception quality may be specified using any suitable quality metric such as, for example, Signal to Noise Ratio (SNR). In an embodiment, the LS receiver may determine a minimal SF value corresponding to the monitored channel quality, and one or more additional SF values higher than the minimal SF value, e.g., corresponding to various constraints such as power consumption, bandwidth limitation, and the like.

At a SF selection operation 108, the LS transmitter selects one of the SFs reported by the LS receiver, according to one or more operational requirements. For example, the LS transmitter selects the maximal SF value from among the candidate SFs, for which the bandwidth of the signal modulated with the spreading code is below the maximal bandwidth supported by the Ethernet link. As another example, the LS transmitter selects the maximal SF value among the candidate SFs for which the power consumption is below a maximum power consumption requirement. As yet another example, the transmitter selects the SF such that a low-complexity echo canceler can be used, or the echo canceler can be eliminated (or disabled).

At a notification operation 112, the LS transmitter notifies the LS receiver of the selected SF (82), which concludes the SF negotiation phase. In some embodiments, each of PHY1 and PHY2 holds the same set of multiple spreading codes. In such embodiments, each of the PHYs selects the common spreading code from among the multiple spreading codes, based on the selected SF value. Alternatively, one of PHY1 and PHY2 selects locally the spreading code based on the selected SF value, and informs the other PHY of the corresponding spreading code.

At a LS transmission operation 116, the LS transmitter transmits to the LS receiver, over the Ethernet link, data modulated using the spreading code having the selected SF value. At a monitoring operation 120, the LS receiver monitors the channel quality using any suitable quality metric such as SNR. Alternatively or additionally, metrics such as, for example, a bit error rate and a frame error rate, can also be used. At a quality checking operation 124, the LS receiver checks whether the channel quality level has varied by more than a specified amount since the previous quality check, and if not, loops back to operation 116 to continue sending LS data from the LS transmitter to the LS receiver. Otherwise, the channel quality has changed by more than the specified amount, in which case the LS receiver selects an updated SF value and sends it to the LS transmitter, at a SF updating operation 128. Following operation 128 the LS method loops back to operation 112, at which the LS transmitter acknowledges the updated SF value to the LS receiver.

The method of FIG. 3 allows the LS receiver to track the channel quality and adapt the SF value to varying channel conditions.

In the example method of FIG. 3, SF modification is triggered when the channel quality changes by a specified amount. In alternative embodiments, other events that may trigger SF modification such as, for example, degradation of the channel quality below a specified quality level, modification of the LS bit rate, or increase in error rate of communicated frames (the errors being correctable or uncorrectable with the underlying line coding).

PHY transceivers 20 and 24 may negotiate the SF value in various ways, e.g., using a suitable Operation Administration and Management (OAM) standard that supports communication of PHY status between peer PHYs interconnected by a wire link.

In some embodiments the PHY transceiver receiving LS data (e.g., PHY2) coordinates with the peer PHY transceiver transmitting the LS data (e.g., PHY1) a time for starting application of the modified SF in sending subsequent LS data. Such a coordination is required to prevent errors in transition to a different SF value on both sides of link. Coordination of the transition to using a modified SF value may be carried out by including a countdown counter in an OAM frame, and starting using the new SF value when the counter reaches a certain value, e.g., when the counter is zeroed. In an alternative embodiment, modifying the SF value on the fly requires entering a special "fast retrain" procedure, during which transmission of LS data are temporarily inhibited, and the peer PHYs negotiate link setting, including the value of the modified SF.

Figure 4:
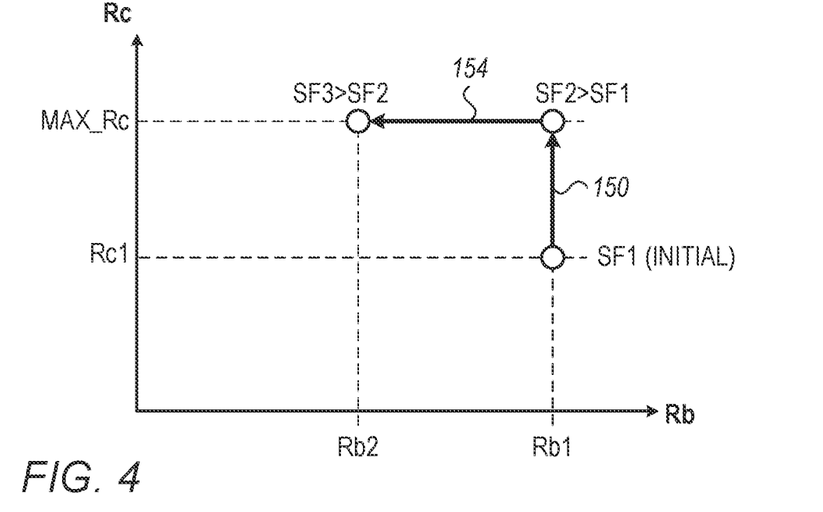
FIG. 4 is a diagram that schematically illustrates a method for increasing the SF value by first increasing the chip-rate and then decreasing the bit rate, in accordance with an embodiment that is described herein.

FIG. 4 is a diagram that schematically illustrates a method for increasing the SF value by first increasing the chip-rate and then decreasing the bit rate, in accordance with an embodiment that is described herein.

In describing the method of FIG. 4 it is assumed that binary data symbols (e.g., bits) are being communicated in the LS direction, meaning that the data rate equals the bit rate.

In the diagram of FIG. 4, the horizontal axis denotes the bit rate (denoted Rb) and the vertical axis denotes the chip-rate (denoted Rc). For a given combination of Rb and Rc values, the SF is given by SF=Rc/Rb.

In the diagram, SF1 denotes an initial SF value corresponding to a bit rate denoted Rb1 and a chip-rate denoted Rc1, so that SF1 is given by SF1=Rc1/Rb1. SF1 may be determined using any suitable method, e.g., as an initial default value, or using negotiation between the PHYs as described above. In the present example, SF1 is determined in accordance with initial condition of the channel in the LS direction.

When the channel conditions degrade it may be beneficial to increase the SF to a value higher than SF1, to compensate for the quality degradation. In the example of FIG. 4, SF1 is first increased by increasing the chip-rate while retaining the bit rate value. In the present example, the SF value is increased from SF1 to SF2>SF1 (depicted by an arrow 150) by increasing the Rc from Rc1 up to a maximal Rc value denoted "MAX Rc." The maximal Rc value depends, for example, on the maximal bandwidth of the underlying Ethernet link, on a maximal power consumption requirement, or both.

If the channel conditions degrade further, the LS receiver is required to increase the SF value from SF2 to SF3>SF2 (depicted by an arrow 154). Since the chip-rate cannot be increase above MAX_Rc, the LS receiver increases the SF by decreasing the bit rate from Rb1 to Rb2<Rb1.

In the diagram of FIG. 4, the SF value is increased by first increasing the chip-rate and if hitting the maximal Rc value, decreasing the bit rate. This process is advantageous when retaining the bit rate is a high-priority requirement. Alternatively, other suitable processes for increasing the SF value can also be used. In an example embodiment, the bit rate may be first reduced from Rb1 to Rb2 while retaining the Rc1 value, and then Rc may be increased from Rc1 up to MAX_Rc while retaining the Rb2 value. In yet another example embodiment, the SF may be increased by modifying both Rc and Rb simultaneously.

Although the diagram FIG. 4 relates to increasing the SF due to degradation in channel conditions, in some scenarios, the SF value may need to be reduced when the channel conditions improve. For example, the SF value may be reduced from SF3 to SF2 by increasing the bit rate from Rb2 to Rb1, and further deceased from SF2 to SF1 by decreasing the Rc value from MAX_Rc to RC1.

The configurations of PHY transceivers 20 and 24 and their components, such as the internal structures of the various LS TXs, LS RXs, HS TXs and HS RXs, as shown in FIGS. 1, and 2, are example configurations that are depicted solely for the sake of clarity. In alternative embodiments, any other suitable configurations can be used. For example, although in the embodiments described above, at least one of PHY1 and PHY2 holds multiple predefined spreading codes, in alternative embodiments, a spreading code can be generated on demand by PHY1 and/or PHY2, depending on the underlying selected SF.

The different elements of PHY transceivers 20 and 24 and their components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of PHY transceivers 20 and 24, e.g., functions of LS transmitter 32, LS receiver 36, HS transmitter 40, and/or HS receiver 44, may be implemented in software and/or using a combination of hardware and software elements. Elements that are not mandatory for understanding of the disclosed techniques have been omitted from the figure for the sake of clarity. For example, each PHY transceiver typically comprises a Media Dependent Interface (MDI) for coupling the transmitter and receiver to link 28.

In some embodiments, some functions of PHY transceivers 20 and 24, e.g., functions of LS transmitter 32, LS receiver 36, HS transmitter 40, and/or HS receiver 44, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although in the embodiments described above, multiplication by the spreading sequence is carried out in the digital domain, this is not mandatory. In alternative embodiments, multiplication (e.g., of bits or data symbols) by the spreading sequence may be carried out in the analog domain.

The embodiments above refer mainly to applying spread spectrum modulation in the LS direction. In alternative embodiments, spread spectrum may be applied in the HS direction, provided that the HS bandwidth used can be increased.

The embodiments described above refer mainly to a full-duplex link. The disclosed embodiments area applicable, however, to links operating using Time Division Multiplexing (TDM) schemes. In such embodiments, spread spectrum modulation may be applied e.g., in time slots serving the LS communication.

Although the embodiments described herein mainly address spread spectrum modulation in an asymmetric link in a vehicle, the methods and systems described herein can also be used in other applications, such as in other asymmetric links. One example of asymmetric link is in the enterprise market for ethernet links, in which most of the links (e.g., to PC, printers, cameras, etc.) carry asymmetric data traffic.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive Ethernet physical-layer (PHY) transceiver, comprising:
   an Analog Front End (AFE) coupled via a full-duplex Ethernet link to a peer transceiver, the AFE configured to:
     receive from the peer transceiver, over the full-duplex Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor comprising a ratio between a spreading chip-rate and the reception data rate; and
     convert the received analog Ethernet signal into a digital signal; and
   a digital processor, configured to:
     de-spread the digital signal using the spreading sequence to recover the data symbols.

2. The automotive Ethernet PHY transceiver according to claim 1, wherein, during a link-training phase, the digital processor is configured to monitor reception conditions affecting the Ethernet signal, and to negotiate with the peer transceiver the Spreading Factor selected from among multiple candidate Spreading Factor values, based at least on the monitored reception conditions.

3. The automotive Ethernet PHY transceiver according to claim 2, wherein the digital processor is configured to determine the candidate Spreading Factor values based on the monitored reception conditions and on one or more of a maximal bandwidth requirement and a power consumption requirement.

4. The automotive Ethernet PHY transceiver according to claim 1, wherein the digital processor is configured to evaluate a criterion for triggering modification of the Spreading Factor, and in response to detecting that the criterion is met, determine a modified Spreading Factor, and inform the peer transceiver of the modified Spreading Factor.

5. The automotive Ethernet PHY transceiver according to claim 4, wherein the digital processor is configured to measure a reception quality or a predicted reception quality of the Ethernet signal, and to determine that the criterion for triggering Spreading Factor modification is met when the reception quality or the predicted reception quality varies by an amount larger than a specified reception quality amount.

6. The automotive Ethernet PHY transceiver according to claim 5, wherein the digital processor is configured to, in response to detecting that the reception quality or the predicted reception quality has increased by more than the specified amount, select the modified Spreading Factor value smaller than the Spreading Factor.

7. The automotive Ethernet PHY transceiver according to claim 5, wherein the digital processor is configured to, in response to detecting that the reception quality or the predicted reception quality has degraded by more than the specified amount, select a modified Spreading Factor value larger than the Spreading Factor.

8. The automotive Ethernet PHY transceiver according to claim 4, wherein the digital processor is configured to determine the modified Spreading Factor by modifying the chip-rate associated with the Spreading Factor, and further associate the modified Spreading Factor with a modified spreading sequence in accordance with the modified chip-rate.

9. The automotive Ethernet PHY transceiver according to claim 4, wherein the digital processor is configured to determine the modified Spreading Factor by modifying the reception data rate of the data symbols.

10. The automotive Ethernet PHY transceiver according to claim 9, wherein the digital processor is configured to specify a maximal chip-rate supported, and to determine the modified Spreading Factor by modifying the reception data rate, when the chip-rate associated with the Spreading Factor has reached the maximal chip-rate supported.

11. The automotive Ethernet PHY transceiver according to claim 4, wherein the digital processor is configured to coordinate with the peer transceiver a time for starting application of the modified Spreading Factor in sending subsequent data symbols from the peer transceiver to the automotive Ethernet PHY transceiver.

12. A method for data communication, comprising:
    in an automotive Ethernet physical-layer (PHY) transceiver coupled via a full-duplex Ethernet link to a peer transceiver,
    receiving from the peer transceiver, over the full-duplex Ethernet link, an analog Ethernet signal conveying data symbols, at a reception data rate that is lower than a transmission data rate used in transmitting data from the PHY transceiver to the peer transceiver, the Ethernet signal being modulated by a spreading sequence having a Spreading Factor comprising a ratio between a spreading chip-rate and the reception data rate, and converting the received analog Ethernet signal into a digital signal; and
    de-spreading the digital signal using the spreading sequence to recover the data symbols.

13. The method according to claim 12, comprising, during a link-training phase monitoring reception conditions affecting the Ethernet signal, negotiating with the peer transceiver the Spreading Factor selected among multiple candidate Spreading Factor values, based at least on the reception conditions.

14. The method according to claim 13, wherein determining the candidate Spreading Factor values comprises determining the candidate Spreading Factor values based on the reception conditions and on one or more of a maximal bandwidth requirement and a power consumption requirement.

15. The method according to claim 12, comprising evaluating a criterion for triggering modification of the Spreading Factor, and in response to detecting that the criterion is met, determining a modified Spreading Factor, and informing the peer transceiver of the modified Spreading Factor.

16. The method according to claim 15, determining that the criterion is met comprises measuring a reception quality or a predicted reception quality of the Ethernet signal, and determining that the criterion for triggering Spreading Factor modification is met when the reception quality or the predicted reception quality varies by an amount larger than a specified reception quality amount.

17. The method according to claim 16, comprising, in response to detecting that the reception quality or the predicted reception quality has increased by more than the specified amount, selecting the modified Spreading Factor value smaller than the Spreading Factor.

18. The method according to claim 16, in response to detecting that the reception quality or the predicted reception quality has degraded by more than the specified amount, selecting a modified Spreading Factor value larger than the Spreading Factor.

19. The method according to claim 15, wherein determining the modified Spreading Factor comprises modifying the chip-rate associated with the Spreading Factor, and further associate the modified Spreading Factor with a modified spreading sequence in accordance with the modified chip-rate.

20. The method according to claim 15, wherein determining the modified Spreading Factor comprises modifying the reception data rate of the data symbols.

21. The method according to claim 20, wherein determining the modified Spreading Factor comprises specifying a maximal chip-rate supported, and determining the modified Spreading Factor by modifying the reception data rate, when the chip-rate associated with the Spreading Factor has reached the maximal chip-rate supported.

22. The method according to claim 15, comprising coordinating with the peer transceiver a time for starting application of the modified Spreading Factor in sending subsequent data symbols from the peer transceiver to the automotive Ethernet PHY transceiver.

23. An automotive Ethernet physical-layer (PHY) transceiver, comprising:

a digital processor, configured to:
receive a sequence of data symbols for transmission to a peer transceiver at a transmission data rate larger than a reception data rate used in receiving data from the peer transceiver;
generate a digital Ethernet signal by modulating the data symbols, wherein the modulation includes using a spreading sequence having a Spreading Factor comprising a ratio between a spreading chip-rate and the transmission data rate; and
convert the digital Ethernet signal to an analog Ethernet signal; and
an Analog Front End (AFE) coupled via a full-duplex Ethernet link to the peer transceiver, the AFE configured to transmit the analog Ethernet signal to the peer transceiver over the full-duplex Ethernet link.

24. The automotive Ethernet physical-layer (PHY) according to claim 23, wherein, during a link-training phase, the digital processor is configured to receive from the peer transceiver multiple candidate Spreading Factor values, to select the Spreading Factor from among the multiple candidate Spreading Factor values, and to inform the peer transceiver of the selected Spreading Factor.

25. A method for data communication, comprising:
in an automotive Ethernet physical-layer (PHY) transceiver that is coupled via a full-duplex Ethernet link to the peer transceiver, receiving a sequence of data symbols for transmission to the peer transceiver at a transmission data rate larger than a reception data rate used in receiving data from the peer transceiver;
generating a digital Ethernet signal by modulating the data symbols, wherein the modulation includes using a spreading sequence having a Spreading Factor comprising a ratio between a spreading chip-rate and the transmission data rate;
converting the digital Ethernet signal to an analog Ethernet signal; and
transmitting the analog Ethernet signal to the peer transceiver over the full-duplex Ethernet link.

26. The method according to claim 25, wherein, comprising, during a link-training phase, receiving from the peer transceiver multiple candidate Spreading Factor values, selecting the Spreading Factor from among the multiple candidate Spreading Factor values, informing the peer transceiver of the selected Spreading Factor.

* * * * *